United States Patent
Atri et al.

(10) Patent No.: US 8,417,414 B2
(45) Date of Patent: Apr. 9, 2013

(54) METHOD AND SYSTEM FOR MANAGING PASSENGER AND VEHICLE SAFETY

(75) Inventors: Amul Atri, Karnataka (IN); Gururaj Rao, Maharashtra (IN); Swapna P. Soman, Karnataka (IN)

(73) Assignee: Infosys Technologies Limited, Bangalore, Karnataka (IN)

( * ) Notice: Subject to any disclaimer, the term of this patent is extended or adjusted under 35 U.S.C. 154(b) by 544 days.

(21) Appl. No.: 12/634,065

(22) Filed: Dec. 9, 2009

(65) Prior Publication Data

US 2010/0152961 A1 Jun. 17, 2010

(30) Foreign Application Priority Data

Dec. 11, 2008 (IN) .............. 3103/CHE/2008

(51) Int. Cl.
*G01M 17/00* (2006.01)
(52) U.S. Cl. ......... 701/33.8; 701/45; 701/49; 701/29.6; 180/173; 180/232; 180/271
(58) Field of Classification Search ........... 701/45, 701/46, 49, 29.6, 33.8, 34.2; 180/170, 173, 180/197, 232, 271, 282
See application file for complete search history.

(56) References Cited

U.S. PATENT DOCUMENTS

| | | | |
|---|---|---|---|
| 5,870,029 A | 2/1999 | Otto et al. | |
| 6,459,988 B1 | 10/2002 | Fan et al. | |
| 6,919,804 B1 | 7/2005 | Cook et al. | |
| 7,133,685 B2 | 11/2006 | Hose et al. | |
| 2003/0016147 A1 | 1/2003 | Evans | |
| 2004/0102896 A1 | 5/2004 | Thayer et al. | |
| 2005/0159883 A1 | 7/2005 | Humphries et al. | |
| 2005/0275522 A1 | 12/2005 | Nitz et al. | |
| 2006/0017564 A1 | 1/2006 | Phillips | |
| 2006/0244588 A1 | 11/2006 | Hannah | |
| 2007/0239992 A1 * | 10/2007 | White et al. | 713/186 |
| 2008/0088438 A1 | 4/2008 | Aninye et al. | |
| 2009/0276150 A1 * | 11/2009 | Vorlander | 701/201 |
| 2010/0274607 A1 * | 10/2010 | Carresjo et al. | 705/7 |

FOREIGN PATENT DOCUMENTS

| | | |
|---|---|---|
| IN | 1007/DEL/2006 | 5/2006 |
| IN | 1504/CHE/2007 | 8/2007 |

* cited by examiner

*Primary Examiner* — Gertrude Arthur Jeanglaude
(74) *Attorney, Agent, or Firm* — Michael Best & Friedrich LLP

(57) ABSTRACT

A method and system for managing passenger and vehicle safety is disclosed. The method includes registering a passenger based on an identification parameter received from the passenger when the passenger boards a vehicle. The method further includes monitoring a set of vehicle status parameters associated with the vehicle in real time. The method also includes generating a notification when a predefined notification condition occurs. The predefined notification condition is associated with at least one of the vehicle status parameters and the identification parameter. The method further includes deregistering the passenger based on the identification parameter when the passenger exits the vehicle.

41 Claims, 6 Drawing Sheets

METHOD AND SYSTEM FOR MANAGING PASSENGER AND VEHICLE SAFETY

BACKGROUND

The invention relates generally to tracking of passengers and vehicles. In particular, the invention relates to a method and system for managing the safety of passengers in a vehicle by monitoring the passengers and the vehicle.

With accidents and other untoward incidents on the rise, managing safety of people during travel is of paramount importance. Nowadays, a lot of employers provide transport for their employees and the onus of ensuring safe travel for their employees lies on the employers. Managing safety of employees becomes crucial for an employer especially when the employees have to work in night shifts. The employer would want to know the employee's whereabouts while the employee travels and whether the employee travelling in a vehicle has reached his/her destination safely. Thus, it is important to monitor the progress of the vehicle in which the passenger is traveling. Further, since such vehicles typically carry multiple passengers, it is also important to keep track of every passenger travelling in the vehicle.

There exist various systems for tracking vehicles, an example being a fleet management system for managing commercial vehicles. The fleet management system involves a vehicle tracking component that uses Global Positioning System (GPS). Typically, the vehicle tracking component involves tracking the vehicles in general without specifically considering the safety of the passengers. However, there may be circumstances when the passenger is in distress and an appropriate authority should be alerted. For example, if the passenger feels threatened by a driver of the vehicle, the passenger may want to alert an appropriate authority without letting the driver know. In another scenario, if the vehicle is involved in an accident, the appropriate authority should be alerted automatically since the passenger may be injured and needs immediate attention.

Accordingly, there is a need for a method and system for efficiently managing the safety of passengers and vehicles. Further, the method and system should also provide assistance in a timely manner when the passenger is in distress.

SUMMARY OF THE INVENTION

The present invention relates to a method for managing passenger and vehicle safety. The method includes registering a passenger based on an identification parameter received from the passenger when the passenger boards a vehicle. The method further includes monitoring a set of vehicle status parameters associated with the vehicle in real time. The method also includes generating a notification when a predefined notification condition occurs. The predefined notification condition is associated with at least one of the vehicle status parameters and the identification parameter. The method further includes deregistering the passenger based on the identification parameter when the passenger exits the vehicle.

The present invention relates to a system for managing passenger and vehicle safety. The system includes a vehicle processing unit for measuring a set of vehicle status parameters associated with the vehicle in real time. The vehicle processing unit includes multiple sensors and a positioning system for measuring the vehicle status parameters. The vehicle processing unit further includes a transceiver for transmitting an identification parameter received from a passenger and the vehicle status parameters to a central processing system. The central processing system registers the passenger based on the identification parameter received from the passenger. The central processing system further analyzes the vehicle status parameters in real time and generates a notification when a predefined notification condition occurs. The central processing system further deregisters the passenger based on the identification parameter received from the passenger.

The present invention relates to a system for managing passenger and vehicle safety. The system includes a vehicle processing unit for measuring a set of vehicle status parameters associated with the vehicle in real time. The vehicle processing unit includes multiple sensors and a positioning system for measuring the vehicle status parameters. The vehicle processing unit further includes a first processing system that analyzes the vehicle status parameters in real time and generates a notification when a predefined notification condition occurs. The vehicle processing unit also includes a transceiver for transmitting an identification parameter to a second processing system. The second processing system registers the passenger based on the identification parameter received from the passenger. The second processing system further deregisters the passenger based on the identification parameter received from the passenger.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

Figure 1:
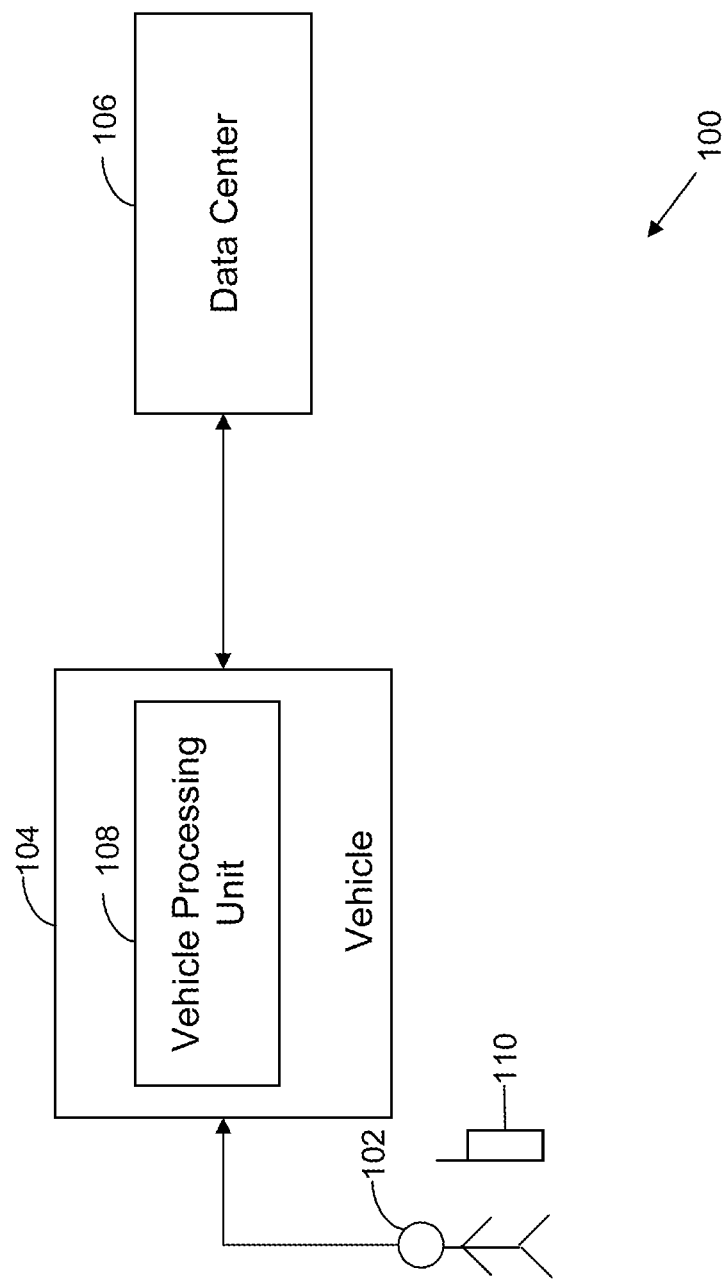
FIG. 1 is a block diagram of a passenger and vehicle safety system 100 in accordance with an embodiment of the present invention.

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

The present invention relates to a method for managing passenger and vehicle safety. The method includes registering a passenger based on an identification parameter received from the passenger when the passenger boards a vehicle. The method further includes monitoring a set of vehicle status parameters associated with the vehicle in real time. The method also includes generating a notification when a predefined notification condition occurs. The predefined notification condition is associated with at least one of the vehicle status parameters and the identification parameter. The method further includes deregistering the passenger based on the identification parameter when the passenger exits the vehicle.

The present invention relates to a system for managing passenger and vehicle safety. The system includes a vehicle processing unit for measuring a set of vehicle status parameters associated with the vehicle in real time. The vehicle processing unit includes multiple sensors and a positioning system for measuring the vehicle status parameters. The vehicle processing unit further includes a transceiver for transmitting an identification parameter received from a passenger and the vehicle status parameters to a central processing system. The central processing system registers the passenger based on the identification parameter received from the passenger. The central processing system further analyzes the vehicle status parameters in real time and generates a notification when a predefined notification condition occurs. The central processing system further deregisters the passenger based on the identification parameter received from the passenger.

The present invention relates to a system for managing passenger and vehicle safety. The system includes a vehicle processing unit for measuring a set of vehicle status parameters associated with the vehicle in real time. The vehicle processing unit includes multiple sensors and a positioning system for measuring the vehicle status parameters. The vehicle processing unit further includes a first processing system that analyzes the vehicle status parameters in real time and generates a notification when a predefined notification condition occurs. The vehicle processing unit also includes a transceiver for transmitting an identification parameter to a second processing system. The second processing system registers the passenger based on the identification parameter received from the passenger. The second processing system further deregisters the passenger based on the identification parameter received from the passenger.

FIG. 1 is a block diagram of a passenger and vehicle safety system 100 in accordance with an embodiment of the present invention. Passenger and vehicle safety system 100 includes a passenger 102, a vehicle 104 and a data center 106. Vehicle 104 includes a vehicle processing unit 108. Passenger 102 has a mobile device 110.

On boarding vehicle 104, passenger 102 sends an identification parameter to vehicle processing unit 108 through mobile device 110. In accordance with an embodiment of the present invention, the identification parameter is the international mobile equipment identity (IMEI) number of mobile device 110. Vehicle processing unit 108 receives the identification parameter from mobile device 110 and transmits it to data center 106. Data center 106 validates the identification parameter and registers passenger 102. As vehicle 104 moves along a predetermined route, vehicle processing unit 108 measures a set of vehicle status parameters associated with vehicle 104 and sends the vehicle status parameters to data center 106. Data center 106 monitors the vehicle status parameters and generates a notification when a predefined notification condition occurs. Further, when the predefined notification condition occurs, data center 106 takes an appropriate action that may include any of notifying the passenger, notifying a nominated third party, and the like. On receiving a predefined code from the passenger, data center 106 validates the predefined code and based on the validation, data center 106 deregisters passenger 102.

In accordance with an embodiment of the present invention, passenger 102 sends an identification parameter to vehicle processing unit 108 through mobile device 110. The identification parameter may be any of international mobile equipment identity (IMEI) number of mobile device 110, electronic serial number (ESN) of mobile device 110, and any other data unique to mobile device 110. The identification parameter may also be any of a predefined code and biometric information of passenger 102. The biometric information includes facial data, fingerprints, voice data and the like. The predefined code may include any of letters, digits and alphanumeric data. The predefined code is indicative of safety of the passenger and may be either a routine code or an emergency code. The routine code indicates that the passenger is safe while the emergency code indicates that the passenger is in distress. For example, SAFE123 may be a routine code and SOS890 may be an emergency code. It should be noted that the predefined code may be unique to the passenger, or it may be the same for all the passengers. In an embodiment, passenger 102 sends the IMEI number as the identification parameter during registration at a first location (that is, the boarding point) and the predefined code as the identification parameter during deregistration at a second location (that is, the alighting point). It will be apparent to a person skilled in the art that a suitable combination of the above mentioned identification parameters may also be used.

Mobile device 110 may be any of a mobile phone, a personal digital assistant (PDA), and the like. In an embodiment, mobile device 110 communicates with vehicle processing unit 108 using a wireless communication technology. Examples of the wireless communication technology include, but are not limited to, Bluetooth®, Radio Frequency Identification (RFID), Wi-Fi, and ZigBee®. Further, mobile device 110 may communicate with data center 106 using any of mobile technologies such as Global System for Mobile communications (GSM), Universal Mobile Telecommunications System (UMTS), Code Division Multiple Access (CDMA), and other mobile technologies known in the art. Mobile device 110 is also capable of communicating with data center 106 by establishing a General Packet Radio Service (GPRS) connection.

Vehicle processing unit 108 is located onboard the vehicle and measures a set of vehicle status parameters associated with the vehicle in real time. The vehicle status parameters include location of the vehicle, its acceleration, its orientation and so forth. Further, vehicle processing unit 108 sends the vehicle status parameters to data center 106 for monitoring of the vehicle status parameters. In accordance with an embodiment of the present invention, each of the vehicle status parameters is associated with a corresponding predefined threshold value. In particular, the acceleration of the vehicle, orientation (or tilt) of the vehicle, and deviation of the vehicle are associated with an acceleration threshold value, an orientation threshold value and a deviation threshold value respectively. Further, vehicle processing unit 108 receives the identification parameter from passenger 102 and sends it to data center 106. In an embodiment, vehicle processing unit 108 includes an internal database (not shown in the figure) for storing details of all passengers.

Data center 106 is located remotely from vehicle processing unit 108 and registers passenger 102 after validating the identification parameter received from vehicle processing unit 108. In particular, data center 106 accesses an internal database (not shown in the figure) and registers passenger 102 when a matching record is found. In accordance with an embodiment of the present invention, registration of passenger 102 includes mapping passenger 102 with the vehicle in which passenger 102 is travelling. Further, data center 106 monitors the vehicle status parameters and generates a notification when the predefined notification condition occurs. Additionally, data center 106 deregisters passenger 102 based on the predefined code received from passenger 102 through mobile device 110. In an embodiment, the deregistration is passenger-initiated. That is, passenger 102 sends the predefined code voluntarily to data center 106 on exiting the vehicle. In another embodiment, data center 106 challenges passenger 102 for the predefined code when vehicle processing unit 108 fails to detect mobile device 110 for a fixed interval of time. As a response, passenger 102 sends the predefined code to data center 106. Data center 106 validates the predefined code and based on the validation, deregisters passenger 102. Deregistration of passenger 102 includes storing alighting details of passenger 102 in the internal database, and notifying both vehicle processing unit 108 and passenger 102 that passenger 102 has been deregistered.

Figure 4:
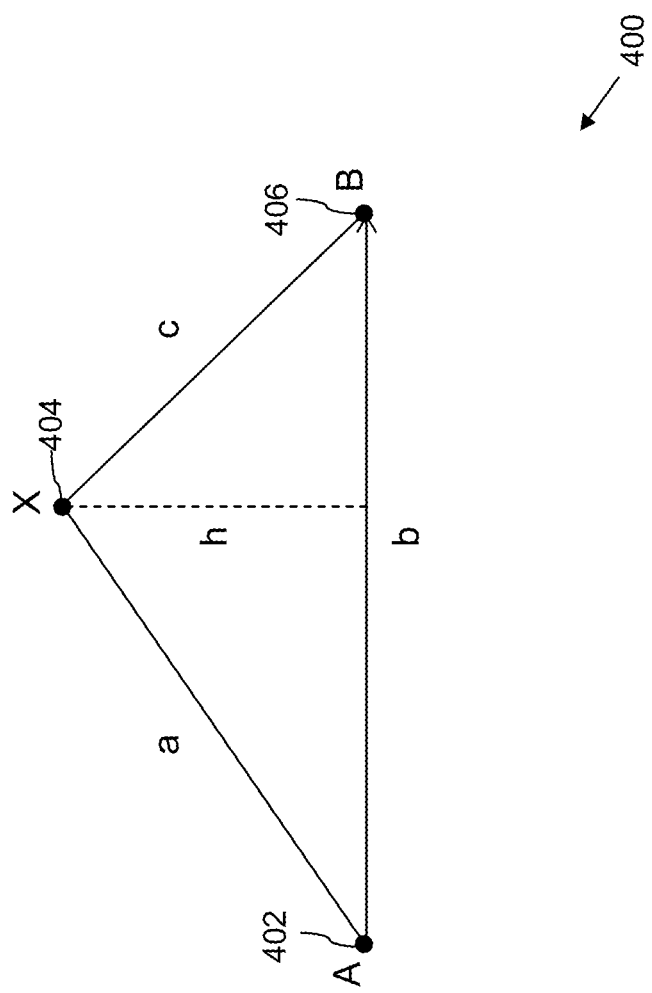
FIG. 4 is a diagram 400 that illustrates a technique for calculating deviation of a vehicle from a predetermined route, in accordance with an embodiment of the present invention.

In accordance with an embodiment of the present invention, data center 106 calculates deviation of the vehicle by comparing a current location of the vehicle relative to a predetermined route in a route map, as described in conjunction with FIG. 4. Further, data center 106 compares the acceleration, orientation, and deviation of the vehicle with an acceleration threshold value, an orientation threshold value, and a deviation threshold value respectively, hereinafter collectively referred to as threshold values. The threshold values may be user-defined and are stored in data center 106. In an embodiment, each of the vehicle status parameters is associated with a lower threshold value and an upper threshold value. Thus, when any of the vehicle status parameters exceeds a corresponding upper threshold value or falls below a corresponding lower threshold value, data center 106 generates a notification.

In accordance with various embodiments of the present invention, the predefined notification condition is said to occur when any of the following occur: at least one of the vehicle status parameters exceeds its corresponding predefined threshold value, passenger 102 sends an emergency code, passenger 102 sends an incorrect predefined code, passenger 102 does not send the predefined code within a fixed interval of time, and so forth. Data center 106 may also generate notifications on occurrence of other conditions such as time required for travel exceeding a predefined time, the passenger exiting the vehicle at a location other than the alighting point, and so forth. Further, when the predefined notification condition occurs, data center 106 takes an appropriate action that includes any of notifying passenger 102, notifying a nominated third party, and so forth. It should be noted that after generating the predefined notification, data center 106 continues to monitor the vehicle status parameters in real time.

Figure 2:
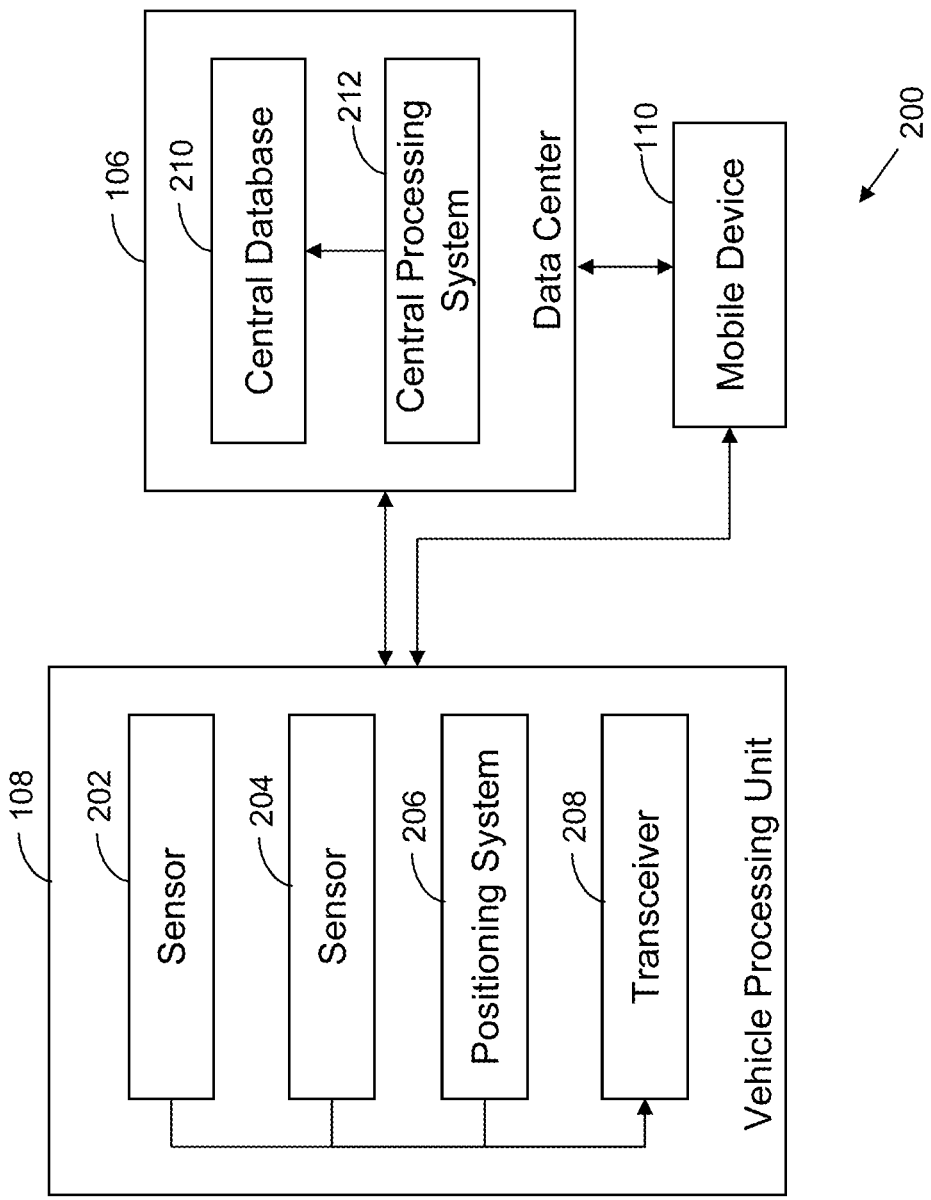
FIG. 2 is a block diagram of a passenger and vehicle safety system 200, in accordance with an embodiment of the present invention.

FIG. 2 is a block diagram of a passenger and vehicle safety system 200, in accordance with an embodiment of the present invention. Passenger and vehicle safety system 200 includes data center 106, vehicle processing unit 108, and mobile device 110. Vehicle processing unit 108 includes a plurality of sensors 202 and 204, a positioning system 206, and a transceiver 208. Data center 106 includes a central database 210 and a central processing system 212. Vehicle processing unit 108 is located onboard the vehicle while data center 106 is remotely located.

Sensor 202 and sensor 204 measure acceleration and orientation of the vehicle respectively. Positioning system 206 transmits current location of the vehicle to transceiver 208. Transceiver 208 receives an identification parameter from mobile device 110 and transmits the identification parameter to central processing system 212. Further, transceiver 208 also transmits the acceleration, the orientation and the location, hereinafter collectively referred to as vehicle status parameters, to central processing system 212. Central processing system 212 registers the passenger based on the identification parameter. Further, central processing system 212 analyzes the vehicle status parameters and generates a notification when a predefined notification condition occurs. Additionally, central processing system 212 takes an appropriate action such as notifying the passenger, or a nominated third party and so forth. The passenger deregisters himself/herself by sending a predefined code to central processing system 212 through mobile device 110. Central processing system 212 validates the predefined code and based on the validation, deregisters the passenger.

Sensor 202 and sensor 204 measure a set of vehicle status parameters in real time and send the measurements to transceiver 208. In particular, sensor 202 and sensor 204 measure acceleration and orientation of the vehicle respectively. Thus, sensor 202 is an accelerometer while sensor 204 is a tilt sensor. It will be apparent to a person skilled in the art that, in addition to sensor 202 and sensor 204, any suitable number of sensors may be included to measure a desired number of vehicle status parameters.

Positioning system 206 transmits the location of the vehicle to transceiver 208 in real time. In accordance with various embodiments of the present invention, positioning system 206 may calculate the location using any of the techniques including, but not limited to, global positioning system (GPS), GSM (or CDMA) triangulation, differential GPS, high sensitivity GPS, an integrated GPS/dead reckoning (DR) system, active RFID, and Real-Time Locating System (RTLS). It will be apparent to a person skilled in the art that any other existing technique or a suitable combination of one or more techniques may also be used to calculate the location. In an embodiment, positioning system 206 using a certain technique may switch to a different technique. For example, when the vehicle passes under a bridge, positioning system 206 using GPS can switch to GSM triangulation. Typically, this switching is required as GPS signals may not be available to positioning system 206 while the vehicle is under the bridge. Once the GPS signals are available, positioning system 206 switches back to GPS.

Transceiver 208 transmits the vehicle status parameters measured by sensor 202, sensor 204 and positioning system 206 to central processing system 212. Further, transceiver 208 transmits the identification parameter received from mobile device 110 to central processing system 212. In an embodiment, transceiver 208 receives the identification parameter from mobile device 110 via any of a wireless communication technology such as Bluetooth®, RFID, ZigBee®, Wi-Fi, and so forth. Transceiver 208 transmits the identification parameter to central processing system 212 using a mobile technology such as GSM, CDMA, UMTS and the like.

In accordance with an embodiment of the present invention, transceiver 208 interrogates mobile device 110 at regular intervals using the wireless communication technology to check if the passenger is onboard the vehicle. When transceiver 208 fails to detect mobile device 110 for a fixed time interval and/or after a predefined number of attempts, transceiver 208 notifies data center 106. For example, the fixed time interval may be set to one minute and the predefined number of attempts may be set to twenty.

Central database 210 includes details of all passengers, hereinafter referred to as passenger information. The passenger information includes name of the passenger, employee code, boarding point, alighting point, a predetermined optimum route for the passenger based on the boarding point and the alighting point, time required for travel, a set of identification parameters for the passenger including a set of predefined codes, emergency contact details, and so forth. It should be noted that the set of predefined codes includes at least a routine code and an emergency code. Further, central database 210 includes a route map containing predetermined routes for the passengers. The route map is represented using a technique discussed in conjunction with FIG. 5. Central database 210 further includes predefined threshold values including, but not limited to, an acceleration threshold value, an orientation threshold value and a deviation threshold value. Additionally, central database 210 includes an action table containing a list of actions to be taken by central processing system 212 when a predefined notification condition occurs.

Central processing system 212 validates the identification parameter received from transceiver 208 using the passenger information stored in central database 210 and registers the passenger. Central processing system 212 may optionally notify the passenger that the registration is complete. In an embodiment, central processing system 212 maps the passenger with the vehicle dynamically. In other words, after one or more passengers travelling in the vehicle are registered with central processing system 212, central processing system 212 maps each passenger with the vehicle and obtains the predetermined routes for each passenger and thereby, for the vehicle. In another embodiment, central processing system 212 has a list of passengers authorized to travel in the vehicle, hereinafter referred to as a pre-authorized list. Accordingly, when central processing system 212 receives the identification parameter from the passenger, central processing system 212 checks the pre-authorized list to verify whether the passenger is authorized to travel in the vehicle. Central processing system 212 registers the passenger if the passenger is an authorized passenger. However, on detection of an unauthorized passenger, central processing system 212 generates a notification. Further, central processing system 212 may also generate a notification when a passenger whose name appears in the pre-authorized list fails to register within a specified interval of time.

Central processing system 212 monitors the vehicle status parameters received from transceiver 208 in real time. In an embodiment, central processing system 212 stores the vehicle status parameters for reference. Further, central processing system 212 calculates deviation of the vehicle by comparing the current location of the vehicle with the predetermined route in the route map, as described in conjunction with FIG. 4. Additionally, central processing system 212 compares each of the vehicle status parameters of the vehicle with its corresponding predefined threshold value and generates a notification when any of the vehicle status parameters exceed their corresponding predefined threshold values. After generating the notification, central processing system 212 takes an appropriate action in accordance with the action table stored in central database 210. For example, if the deviation of the vehicle exceeds the deviation threshold value, central processing system 212 sends a notification to the passenger on mobile device 110 using any of short message service (SMS), a voice call, mobile instant messaging, and so forth. On the other hand, if the acceleration and/or orientation of the vehicle exceed their corresponding predefined threshold values, which are indicative of an accident, central processing system 212 notifies a nominated third party such as an ambulance service, an emergency contact of the passenger, and the like. In an embodiment, central processing system 212 checks past stored values of acceleration and/or speed of the vehicle before notifying the nominated third party. Further, after generating the notification, central processing system 212 continues real-time monitoring of the vehicle status parameters.

Central processing system 212 deregisters the passenger using a challenge-response mechanism to verify that the passenger has safely alighted from the vehicle. In an embodiment, the challenge response mechanism includes password authentication. The passenger sends a predefined code consisting of letters, digits, or alphanumeric data to central processing system 212 through any of GPRS, SMS, and the like. The predefined code may be either a routine code or an emergency code. On receiving the routine code, central processing system 212 deregisters the passenger. However, on receiving the emergency code, central processing system 212 notifies any of the police, an emergency contact of the passenger, and the like. It should be noted that the passenger may send the emergency code at any point of time during his/her travel to denote distress.

In accordance with an embodiment of the present invention, central processing system 212 generates a notification when transceiver 208 fails to detect mobile device 110 for a fixed interval of time. Further, central processing system 212 challenges the passenger for the predefined code by using any of an SMS, a voice call, mobile instant messaging, and the like. On receiving the predefined code from the passenger, central processing system 212 validates the predefined code and based on the validation, deregisters the passenger. However, if the passenger does not send the predefined code within a fixed interval of time or if the passenger sends an incorrect predefined code, central processing system 212 generates a notification. In another embodiment, the passenger sends the predefined code voluntarily on exiting the vehicle.

It should be noted that when multiple passengers travel in a vehicle, central processing system 212 performs registration and deregistration individually for every passenger. Further, transceiver 208 constantly checks for the presence of each of the passengers inside the vehicle using the wireless communication technology as described previously.

In accordance with an embodiment of the present invention, passenger and vehicle safety system 200 further includes a biometric system (not shown in the figure) for authenticating the passenger based on biometric information received from the passenger. The biometric information may include any of facial data, fingerprints, voice, and so forth. Biometric systems are well known in the art and hence will not be described in detail herewith. It should be noted that the biometric information may be used as an identification parameter during registration and/or deregistration of the passenger in conjunction with another identification parameter for additional security.

Figure 3:
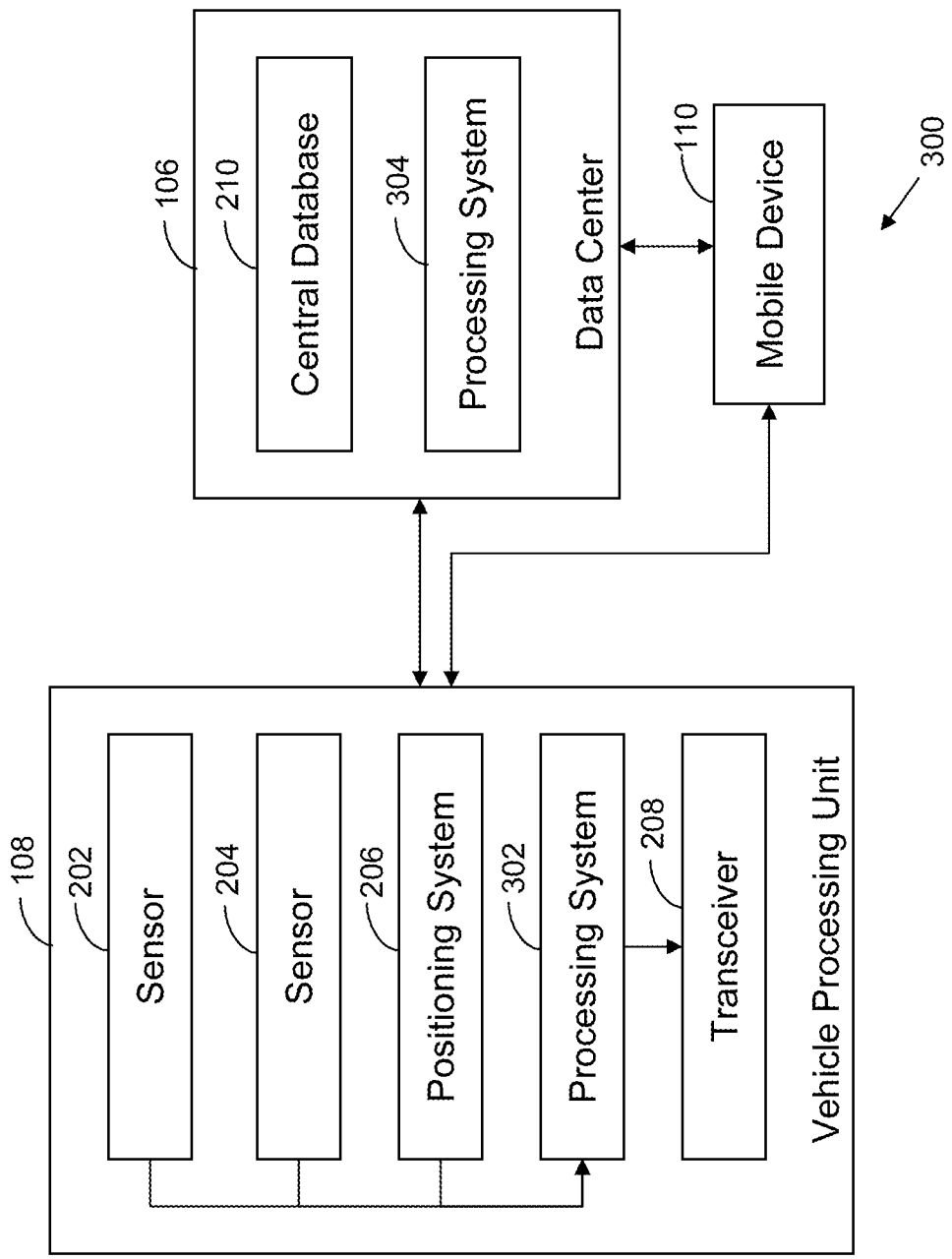
FIG. 3 is a block diagram of a passenger and vehicle safety system 300, in accordance with another embodiment of the present invention.

FIG. 3 is a block diagram of a passenger and vehicle safety system 300 in accordance with another embodiment of the present invention. Passenger and vehicle safety system 300 includes data center 106, vehicle processing unit 108 and mobile device 110. Vehicle processing unit 108 includes sensor 202, sensor 204, positioning system 206, a processing system 302 and transceiver 208. Data center 106 includes central database 210 and a processing system 304.

Processing system 302, hereinafter referred to as first processing system 302, analyzes vehicle status parameters measured by sensor 202, sensor 204, and positioning system 206, and generates a notification when a predefined notification condition occurs. Further, when the predefined notification condition occurs, first processing system 302 notifies processing system 304, hereinafter referred to as second processing system 304. Transceiver 208 receives an identification parameter associated with the passenger from mobile device 110 and transmits the identification parameter to second processing system 304. Second processing system 304, validates the identification parameter and registers the passenger. Further, on occurrence of the predefined notification condition, second processing system 304 takes an appropriate action such as notifying the passenger or a nominated third party. The passenger deregisters himself/herself by sending a predefined code to second processing system 304. Second processing system 304 validates the predefined code and based on the validation, deregisters the passenger.

In accordance with an embodiment of the present invention, first processing system 302 is located onboard the vehicle and receives the vehicle status parameters from sensors 202, 204 and positioning system 206. Further, vehicle processing unit 108 includes an internal database (not shown in the figure) containing at least a route map and predefined threshold values associated with the vehicle status parameters. First processing system 302 calculates deviation of the vehicle from a predetermined route in the route map, as described in conjunction with FIG. 4. First processing system 302 monitors the vehicle status parameters and generates a notification when the predefined notification condition occurs. Further, first processing system 302 notifies second processing system 304 when the predefined notification condition occurs. In accordance with various embodiments of the present invention, the predefined notification condition is said to occur when any of the following occur: at least one of the vehicle status parameters exceeds its corresponding predefined threshold value, the passenger sends an emergency code, the passenger sends an incorrect predefined code, the passenger does not send the predefined code within a fixed interval of time, and so forth. First processing system 302 may also generate notifications on occurrence of other conditions such as time required for travel exceeding a predefined time, the passenger exiting the vehicle at a location other than the alighting point, and so forth.

Second processing system 304 validates the identification parameter received from the passenger and registers the passenger using the passenger information stored in central database 210. Similarly, second processing system 304 deregisters the passenger after validating the predefined code sent by the passenger using mobile device 110. Further, second processing system 304 takes an appropriate action based on the notification generated by first processing system 302. The appropriate action may include notifying the passenger, or a nominated third party, and so forth. In an embodiment, second processing system 304 challenges the passenger for the predefined code when transceiver 208 fails to detect mobile device 110 for a fixed interval of time. On receiving the predefined code, second processing system 304 validates the predefined code and deregisters the passenger based on the validation. In another embodiment, the passenger sends the predefined code voluntarily on exiting the vehicle. It will be apparent to a person skilled in the art that one or more functions of second processing system 304 may be performed by first processing system 302 with suitable modifications.

FIG. 4 is a diagram 400 that illustrates a technique for calculating deviation of a vehicle from a predetermined route, in accordance with an embodiment of the present invention. Diagram 400 includes a starting point A 402, an intermediate point X 404 and a destination point B 406.

The vehicle starts from starting point A 402 and has to reach destination point B 406. The predetermined route is along the straight line AB. However, to avoid traffic congestion on the predetermined route AB, the vehicle takes an alternate route, thereby deviating from the predetermined route. Current location of the vehicle is intermediate point X 404. It should be noted that starting point A 402, intermediate point X 404 and destination point B 406 are locations defined by individual latitudes (lat) and longitudes (long). In the figure, the lengths of segments AX, AB and BX are denoted by 'a', 'b', and 'c' respectively. In accordance with an embodiment of the present invention, deviation of the vehicle is measured by drawing a perpendicular from intermediate point X 404 on to segment AB, denoted by 'h' in the figure. The deviation 'h', which is the shortest distance from intermediate point X 404 to the straight line AB, is calculated using the following formula:

$$h = 2/b * (sqrt(s(s-a)(s-b)(s-c))), \text{ where } s = (a+b+c)/2$$

In accordance with an embodiment of the present invention, given a pair of latitude and longitude, for example starting point A 402 (lat1, long1) and intermediate point X 404 (lat2, long2), the distance 'a' between them is calculated using the following formula.

$$a = R*2*a \tan 2(sqrt(\sin^2(\Delta lat/2) + \cos(lat1) \cdot \cos(lat2)$$
$$\cdot \sin^2(\Delta long/2)), sqrt(1 - (\sin^2(\Delta lat/2) + \cos(lat1) \cdot \cos$$
$$(lat2) \cdot \sin^2(\Delta long/2))))$$

where,
R=earth's radius (mean radius=6,371,000 m);
Δlat=lat2−lat1;
Δlong=long 2−long 1; and
'a' is in meters.

Similarly, the distances 'b' and 'c' are calculated. In accordance with an embodiment of the present invention, when the deviation 'h' exceeds a deviation threshold value, a notification is generated and the passenger is notified. Using this technique, even small deviations may be easily calculated and accordingly, any suitable value may be assigned to the deviation threshold value.

Figure 5:
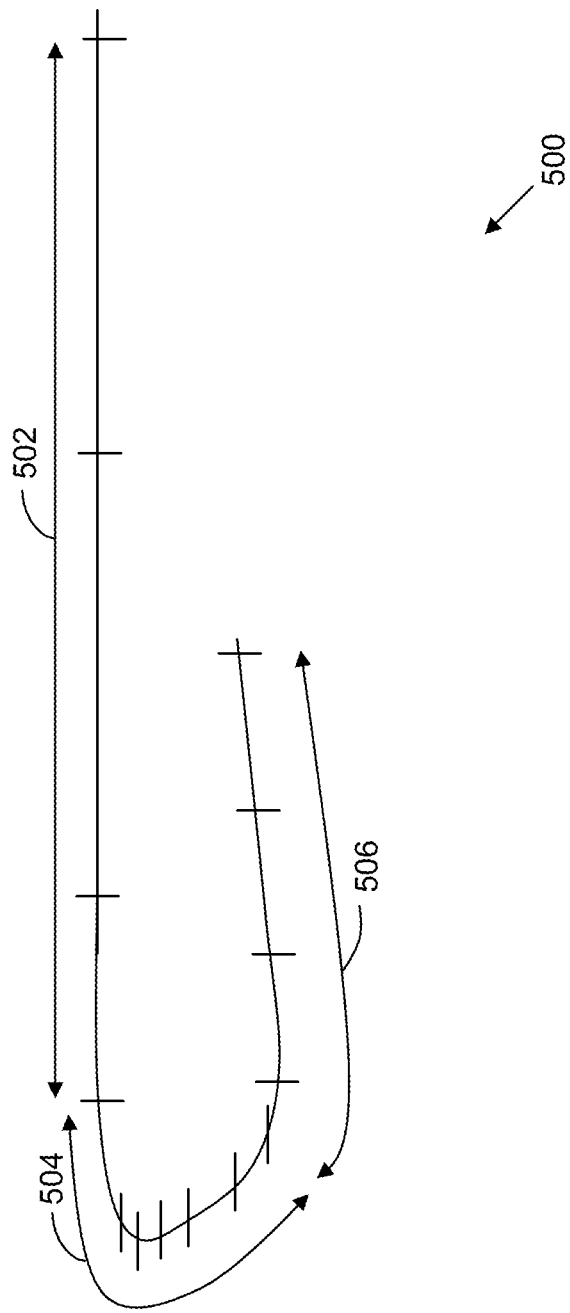
FIG. 5 shows representation of a route 500 in accordance with an embodiment of the present invention.

FIG. 5 shows representation of a route 500 in accordance with an embodiment of the present invention. Route 500 includes a straight line 502, a sharp curve 504 and a soft curve 506.

In accordance with an embodiment of the present invention, route 500 is divided into a set of route segments. Each route segment has a starting node and a corresponding ending node and sharpness of curvature at different points along each of the route segments is calculated. Route 500 is then represented using a new set of route segments where the length of each route segment in the new set is proportional to the sharpness of curvature at different points along each of the route segment as calculated earlier.

As shown in the figure, sharper curves are represented using more nodes while a straight segment is represented using lesser nodes irrespective of the length of the straight segment, thus reducing data required for representing route 500. Thus, straight line 502 is represented using a lesser number of nodes, soft curve 506 is represented using more number of nodes and sharp curve 504 is represented using the maximum number of nodes. A central processing system, such as central processing system 212, stores the route map in a central database, such as central database 210, and accesses the route map while monitoring the vehicle status parameters of a vehicle, as described in FIG. 2.

Figure 6:
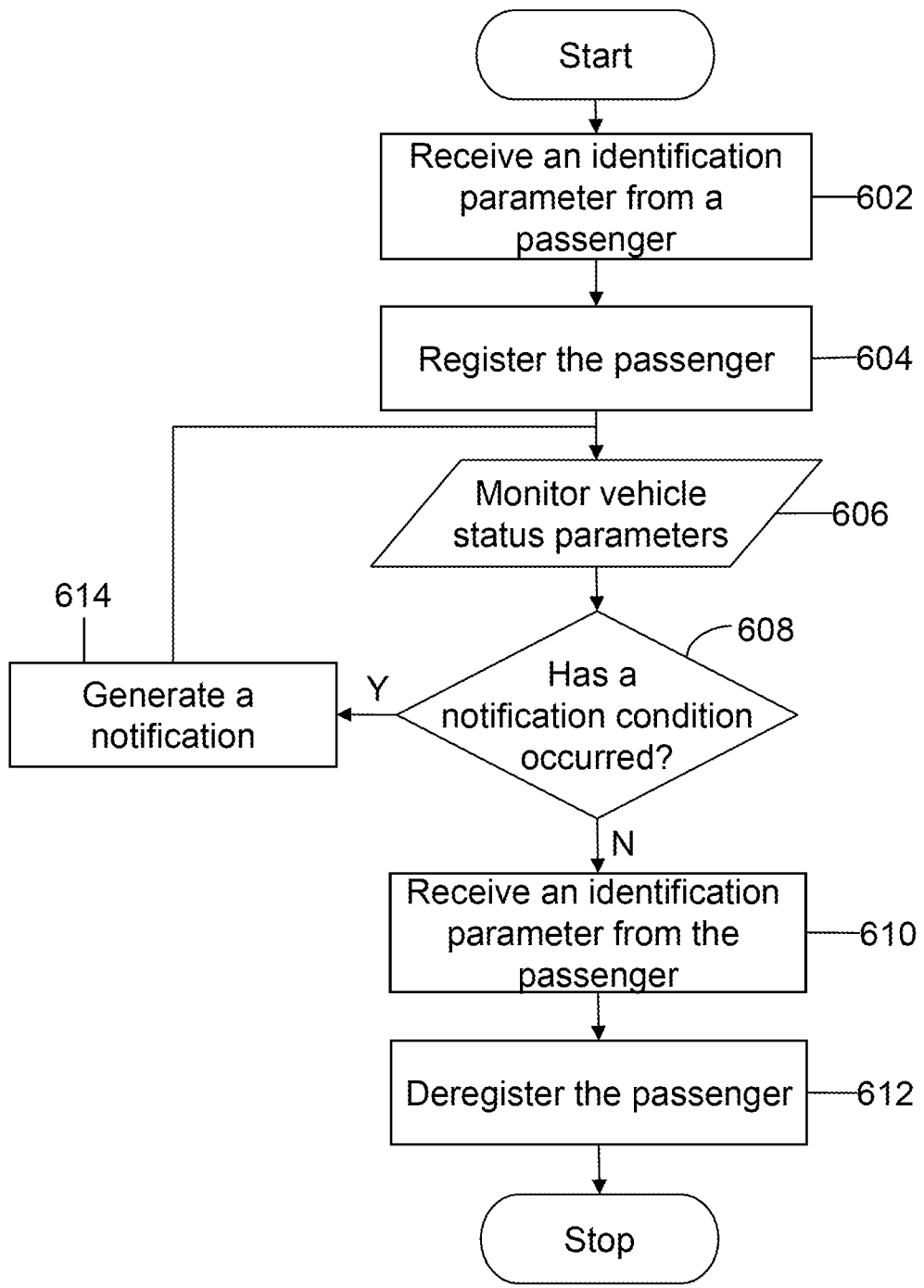
FIG. 6 shows a method for managing passenger and vehicle safety in accordance with an embodiment of the present invention.

FIG. 6 shows a method for managing passenger and vehicle safety in accordance with an embodiment of the present invention. At step 602, an identification parameter is received from a passenger. In accordance with an embodiment of the present invention, the identification parameter may be any of IMEI of a mobile device of the passenger, ESN of the mobile device, a predefined code and biometric information. The predefined code may be a routine code or an emergency code. At step 604, the identification parameter is validated and the passenger is registered. At step 606, vehicle status parameters are monitored in real time. The vehicle status parameters include location of the vehicle, acceleration, orientation (or tilt) and so forth. At step 608, it is checked whether a predefined notification condition has occurred. In accordance with an embodiment of the present invention, the predefined notification condition includes any of the vehicle status parameters exceeding a predefined threshold value, the passenger not sending the predefined code within a fixed time interval, the passenger sending an incorrect predefined code, the passenger sending an emergency code, and so forth.

If the predefined notification condition has occurred, at step 614, a notification is generated and an appropriate action such as notifying the passenger and/or a nominated third party is taken. The process again moves to step 606 and the monitoring of the vehicle status parameters in real time continues. However, if the notification condition has not occurred, the process continues to step 610 where an identification parameter is received from the passenger for deregistration. The identification parameter for deregistration may be the same as the one used for registration or it may be different. In accordance with an embodiment of the present invention, the passenger sends the predefined code as the identification parameter for deregistration. At step 612, the predefined code is validated and based on the validation, the passenger is deregistered.

Thus, using the disclosed method and system, the safety of a passenger travelling in/on a vehicle can be managed. The passenger is registered with a central processing system when the passenger boards the vehicle. The central processing system notifies the passenger when specific notification conditions are detected. Based on the notification generated, the driver of the vehicle may also be notified along with the passenger. The passenger may then take a suitable action such as asking the driver to stop the vehicle, calling a helpline, and so forth. Further, in case of an accident, the method and system automatically notify a nominated third party such as an ambulance service, the police, an emergency contact of the passenger, and the like so that immediate measures may be taken by the third party. This ensures that, in case of emergencies, the passenger is assured of timely assistance and untoward incidents are minimized. The passenger is deregistered on exiting the vehicle.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

What is claimed is:

1. A method for managing passenger and vehicle safety, the method comprising:
   registering a passenger when the passenger enters a vehicle, wherein the registration comprises directly receiving by a vehicle processing unit, one of a plurality of identification parameters from a mobile phone of the passenger,
   mapping the passenger with the vehicle, and
   wherein the registration is performed at a first location based on at least one of the plurality of identification parameters received from the passenger;
   monitoring a plurality of vehicle status parameters in real time, wherein the plurality of vehicle status parameters comprise location of the vehicle relative to a predetermined route in the route map;
   generating a notification when a predefined notification condition occurs, wherein the predefined notification condition is associated with at least one of the vehicle status parameters and the identification parameters; and
   deregistering the passenger when the passenger exits the vehicle, the deregistration being performed at a second location based on at least one of the plurality of identification parameters received from the passenger.

2. The method as recited in claim 1, wherein the step of registering the passenger comprises validating the at least one of the plurality of identification parameters received from the passenger.

3. The method as recited in claim 1, wherein the plurality of vehicle status parameters comprise at least one of acceleration of the vehicle and orientation of the vehicle.

4. The method as recited in claim 3, wherein the predefined notification condition comprises the acceleration of the vehicle exceeding an acceleration threshold value.

5. The method as recited in claim 3, wherein the predefined notification condition comprises the orientation of the vehicle exceeding an orientation threshold value.

6. The method as recited in claim 1, wherein the step of monitoring the vehicle status parameters comprises determining deviation of the vehicle from the predetermined route in the route map.

7. The method as recited in claim 6, wherein the step of determining the deviation of the vehicle further comprises the steps of:

a. representing the predetermined route using a plurality of route segments whose lengths are inversely proportional to sharpness of curvature at a plurality of points along each of the plurality of route segments; and b. calculating shortest distance between current location of the vehicle and the route segment closest to the current location of the vehicle.

8. The method as recited in claim 6, wherein the predefined notification condition comprises the deviation of the vehicle exceeding a deviation threshold value.

9. The method as recited in claim 1, wherein the step of registering the passenger is performed dynamically.

10. The method as recited in claim 1, wherein the step of registering the passenger is performed based on a pre-authorized list.

11. The method as recited in claim 1, wherein the plurality of identification parameters comprise at least one of an international mobile equipment identity number of a mobile device of the passenger, an electronic serial number, a predefined code and biometric information.

12. The method as recited in claim 11, wherein the predefined notification condition comprises receiving an incorrect predefined code from the passenger.

13. The method as recited in claim 11, wherein the predefined notification condition comprises not receiving the predefined code from the passenger within a fixed interval of time.

14. The method as recited in claim 11, wherein the predefined code is a routine code.

15. The method as recited in claim 11, wherein the predefined code is an emergency code.

16. The method as recited in claim 15, wherein the predefined notification condition comprises receiving the emergency code from the passenger.

17. The method as recited in claim 1, wherein the step of deregistering the passenger comprises validating the at least one of the plurality of identification parameters received from the passenger.

18. A system for managing passenger and vehicle safety, the system comprising:
  a vehicle processing unit for measuring a plurality of vehicle status parameters in real time, the vehicle processing unit comprising:
    a plurality of sensors;
    a positioning system, the positioning system used to determine location of the vehicle;
  a transceiver for transmitting and receiving:
    at least one of a plurality of identification parameters for registering and deregistering a passenger, and
    the plurality of vehicle status parameters; and
  a central processing system for:
    registering the passenger based on at least one of the plurality of identification parameters received from the passenger, wherein, the registration comprises directly receiving by the vehicle processing unit, one of the plurality of the identification parameters from a mobile phone of the passenger;
    analyzing the plurality of vehicle status parameters in real time;
    generating a notification when a predefined notification condition occurs, wherein the predefined notification condition is associated with at least one of the vehicle status parameters and the identification parameters; and
    deregistering the passenger based on at least one of the plurality of identification parameters received from the passenger.

19. The system as recited in claim 18, wherein the vehicle processing unit is located onboard the vehicle.

20. The system as recited in claim 18, wherein the central processing system is remotely located in a data center.

21. The system as recited in claim 18, wherein the plurality of vehicle status parameters comprise at least one of acceleration of the vehicle and orientation of the vehicle.

22. The system as recited in claim 21, wherein the predefined notification condition comprises the acceleration of the vehicle exceeding an acceleration threshold value.

23. The system as recited in claim 21, wherein the predefined notification condition comprises the orientation of the vehicle exceeding an orientation threshold value.

24. The system as recited in claim 18, wherein the predefined notification condition comprises deviation of the vehicle exceeding a deviation threshold value.

25. The system as recited in claim 18, wherein the central processing system initiates the deregistration of the passenger.

26. The system as recited in claim 18, wherein the deregistration is passenger-initiated.

27. The system as recited in claim 18, further comprising a biometric system for authenticating the passenger.

28. The system as recited in claim 18, wherein the plurality of identification parameters comprise at least one of an international mobile equipment identity number of a mobile device of the passenger, an electronic serial number, a predefined code and biometric information.

29. The system as recited in claim 28, wherein the predefined notification condition comprises receiving an incorrect predefined code from the passenger.

30. The system as recited in claim 28, wherein the predefined notification condition comprises not receiving the predefined code from the passenger within a fixed interval of time.

31. The system as recited in claim 28, wherein the predefined code is a routine code.

32. The system as recited in claim 28, wherein the predefined code is an emergency code.

33. The system as recited in claim 32, wherein the predefined notification condition comprises receiving the emergency code from the passenger.

34. A system for managing passenger and vehicle safety, the system comprising:
  a vehicle processing unit for measuring a plurality of vehicle status parameters in real time, the vehicle processing unit comprising:
    a plurality of sensors;
    a positioning system, the positioning system used to determine location of the vehicle;
  a transceiver for transmitting and receiving:
    at least one of a plurality of identification parameters for registering and deregistering a passenger; and
    the plurality of vehicle status parameters; and
  a first processing system for:
    analyzing the plurality of vehicle status parameters in real time; and
    generating a notification when a predefined notification condition occurs, wherein the predefined notification condition is associated with at least one of the vehicle status parameters and the identification parameters; and
  a second processing system for:
    registering the passenger based on at least one of the plurality of identification parameters received from the passenger, wherein, the registration comprises directly receiving by the vehicle processing unit, one of the plurality of the identification parameters from a mobile phone of the passenger; and deregistering the passenger based on at least one of the plurality of identification parameters received from the passenger.

35. The system as recited in claim 34, wherein at least one of the first processing system and the second processing system is located onboard the vehicle.

36. The system as recited in claim 34, wherein the second processing system initiates the deregistration of the passenger.

37. The system as recited in claim 34, wherein the deregistration is passenger-initiated.

38. The system as recited in claim 34, wherein the plurality of vehicle status parameters comprise at least one of acceleration of the vehicle and orientation of the vehicle.

39. The system as recited in claim 34, wherein the plurality of identification parameters comprise at least one of an international mobile equipment identity number of a mobile device of the passenger, an electronic serial number, a predefined code and biometric information.

40. A computer storage device tangibly embodying a plurality of instructions adapted for managing passenger and vehicle safety, comprising:

a computer readable medium storing:

a registration module for registering a passenger based on at least one of a plurality of identification parameters, wherein, the registration comprises directly receiving by a vehicle processing unit, one of the plurality of identification parameters from a mobile phone of the passenger;

an analysis module for analyzing a plurality of vehicle status parameters, wherein the plurality of vehicle status parameters comprise location of a vehicle relative to a predetermined route in a route map;

a notification module for generating a notification when a predefined notification condition occurs, wherein the predefined notification condition is associated with at least one of the vehicle status parameters and the identification parameters; and a deregistration module for deregistering the passenger based on at least one of the plurality of identification parameters.

41. The computer storage device as recited in claim 40, wherein the plurality of identification parameters comprise at least one of an international mobile equipment identity number of a mobile device of the passenger, an electronic serial number, a predefined code and biometric information.

* * * * *